(12) United States Patent
Johnson et al.

(10) Patent No.: US 10,972,275 B1
(45) Date of Patent: Apr. 6, 2021

(54) ZERO-KNOWLEDGE, ANONYMOUS VERIFICATION AND MANAGEMENT USING IMMUTABLE DATABASES SUCH AS BLOCKCHAIN

(71) Applicant: Imageware Systems, Inc., San Diego, CA (US)

(72) Inventors: Richard Johnson, Hillsboro, OR (US); David Harding, Portland, OR (US); Dale Peek, Happy Valley, OR (US); Steve Timm, Bend, OR (US); Matt Klepp, Portland, OR (US); Robb Wijnhausen, Portland, OR (US)

(73) Assignee: ImageWare Systems, Inc., San Diego, CA (US)

( * ) Notice: Subject to any disclaimer, the term of this patent is extended or adjusted under 35 U.S.C. 154(b) by 277 days.

(21) Appl. No.: 16/038,117

(22) Filed: Jul. 17, 2018

(51) Int. Cl.
H04L 29/06 (2006.01)
H04L 9/32 (2006.01)
G06F 16/18 (2019.01)

(52) U.S. Cl.
CPC ........ H04L 9/3221 (2013.01); G06F 16/1865 (2019.01); H04L 9/3213 (2013.01); H04L 9/3231 (2013.01); H04L 9/3247 (2013.01); H04L 9/3297 (2013.01)

(58) Field of Classification Search
CPC ... H04L 9/3221; H04L 9/3213; H04L 9/3231; H04L 9/3247; H04L 9/3297; G06F 16/1865
See application file for complete search history.

(56) References Cited

U.S. PATENT DOCUMENTS

| | | | |
|---|---|---|---|
| 928,528 | A | 7/1909 | Martin |
| 5,140,634 | A | 8/1992 | Guillou et al. |
| 5,280,527 | A | 1/1994 | Gullman et al. |
| 6,226,383 | B1 | 5/2001 | Jablon |
| 6,263,446 | B1 | 7/2001 | Kausik et al. |
| 6,363,365 | B1 | 3/2002 | Kou |
| 6,807,277 | B1 | 10/2004 | Doonan et al. |
| 7,080,041 | B2 | 7/2006 | Nagel |
| 7,181,017 | B1 | 2/2007 | Nagel et al. |
| 7,264,152 | B2 | 9/2007 | Tsuei et al. |
| 7,298,873 | B2 | 11/2007 | Miller et al. |
| 7,362,884 | B2 | 4/2008 | Willis et al. |
| 8,621,646 | B2 * | 12/2013 | Chaudhry ............. H04L 9/3213 726/27 |
| 8,887,259 | B1 | 11/2014 | Harding |
| 9,268,904 | B1 | 2/2016 | Harding |
| 9,425,958 | B2 * | 8/2016 | Vennelakanti .......... H04L 63/06 |
| 2004/0117430 | A1 * | 6/2004 | Bazot ...................... H04L 63/08 709/200 |
| 2005/0108551 | A1 * | 5/2005 | Toomey ................... G06F 21/33 713/185 |
| 2005/0154924 | A1 * | 7/2005 | Scheidt .............. G06Q 20/3674 726/19 |

(Continued)

*Primary Examiner* — Sarah Su
(74) *Attorney, Agent, or Firm* — Nicholas A. Cole

(57) ABSTRACT

A verification system using additional factors such as biometrics can provide a tenant system with the ability to verify the identity of an end user. The enrollment and verification can be performed without sharing identity knowledge between the tenant and the verification ensuring the privacy of the end user. The enrollment and verification can also be performed in an auditable way while maintaining anonymity.

13 Claims, 7 Drawing Sheets

(56) References Cited

U.S. PATENT DOCUMENTS

| | | |
|---|---|---|
| 2005/0166263 A1* | 7/2005 | Nanopoulos .......... H04L 9/3228 726/7 |
| 2007/0195999 A1 | 8/2007 | Willis |
| 2007/0198432 A1* | 8/2007 | Pitroda ................ G06F 21/606 705/64 |
| 2010/0146263 A1* | 6/2010 | Das ..................... G06Q 20/425 713/155 |
| 2013/0174243 A1 | 7/2013 | Inatomi et al. |
| 2014/0310786 A1 | 10/2014 | Harding |
| 2014/0313007 A1 | 10/2014 | Harding |
| 2016/0226867 A1 | 8/2016 | Harding |
| 2017/0364552 A1* | 12/2017 | Pattanaik .............. H04L 9/3297 |
| 2018/0227293 A1* | 8/2018 | Uhr .................... G06Q 20/3821 |
| 2018/0332016 A1* | 11/2018 | Pandey ................ H04L 63/108 |
| 2019/0340350 A1* | 11/2019 | Campbell ............... G06F 21/42 |
| 2019/0372767 A1* | 12/2019 | Mahajan ............ H04L 63/0807 |

\* cited by examiner

ZERO-KNOWLEDGE, ANONYMOUS VERIFICATION AND MANAGEMENT USING IMMUTABLE DATABASES SUCH AS BLOCKCHAIN

BACKGROUND OF INVENTION

1. Field of Invention

The present invention relates to the fields of computer networking and computer security, and more particularly to identity verification techniques in a zero-knowledge, anonymous system.

2. Description of Related Art

Additional factor authentication systems are employed by many online services to provide additional confirmation of the identity of the user. These additional factors can include text messages, email addresses, out-of-band communications to a mobile device, and biometric identification. Because the complexity of some forms of confirmation are complicated or require specialized hardware or software, third-party or external services are employed to perform the confirmation. As a result, vulnerability is created between an online service (hereinafter referred to as the tenant system) and the verification service that requires an additional security burden.

In a common implementation, both the tenant system and the verification system share a common identifier. If a malicious actor intercepts communications between the tenant system and the verification system, the common identifier for a user can associate that identifier with information compromised on either the tenant system or the verification system, potentially compromising the user's privacy.

In a simple verification protocol, upon a request for verification by the tenant system, a simple affirmative or negative response along with proof-of-work is provided back the tenant system depending on the outcome of the verification. However, due to the simplicity of the response, a man-in-the-middle attack could insert a forged response.

The aforementioned issues arise once the tenant system relies on an external verification system especially when the two systems are under separate ownership and control.

SUMMARY OF THE INVENTION

The present invention overcomes these and other deficiencies of the prior art by providing a verification system implementing a method of validating the identity of a user at a verification system. A tenant system sends the verification system a validation request comprising an encrypted token associated with the user. A unique identifier associated with the user is extracted by decrypting the encrypted token. The verification system then requests and receives identity information from the user. The identity information is then validated against the identity information previously enrolled for that unique identifier. The verification system then sends a response to the tenant system with the status of success or failure based on the validation. The verification system creates a private transaction receipt comprising the transaction identifier, the user identifier, the identifier for the tenant system and user information. The verification system also creates a public transaction receipt comprising the transaction identifier and a hash formed from the user identifier, the identifier for the tenant system and the user information.

In another embodiment, the verification system can implement a method of enrolling a user with the tenant system. The tenant system sends the verification system a request for enrollment. The verification system requests and receives identity information from the user. The verification system creates a unique identifier and assigns it to the user. The unique identifier associated with this identity information and can be stored in a database indexed by the unique identifier. The verification system creates a token comprising the unique identifier and the tenant system identifier. The token is encrypted with a secret key held at the verification system to form an encrypted token. The encrypted token is sent to the tenant system along with a transaction identifier. A private transaction receipt is created comprising the transaction identifier, the user identifier, the tenant system identifier and user information. A second public transaction receipt comprising the transaction identifier and a hash formed from the user identifier, the tenant system identifier and the user information.

Both the responses sent to the tenant system for the enrollment and verification can comprise a timestamp. As well, both responses can be digitally signed. The public transaction receipts can also be digitally signed and can be stored in a public data store such as a database or blockchain. The private transaction receipts mentioned can be stored in an immutable database.

In another embodiment, the verification system can implement a method of validating a transaction. One example is where an auditor sends a transaction identifier to the verification system. The verification system retrieves the private transaction receipt associated with the transaction identifier for example from a private immutable database. The private transaction receipt can comprise a user identifier, a tenant identifier and user information. The verification system creates a hash from the user identifier, the tenant identifier and the user information and provides the hash to the auditor. The auditor can then compare the hash to one included in the public transaction receipt.

Alternatively, the auditor can send a public transaction receipt to the verification system. The verification system extracts the transaction identifier from the public transaction receipt and retrieves the corresponding private transaction receipt associated with this transaction identifier. A hash is created from the user identifier, the tenant identifier and the user information. The hash is compared to the hash contained in the public transaction receipt and the transaction is validated or disputed depending on whether the hashes match.

The verification system comprises a processor, network interface, database and memory. The memory contains instructions that can cause the processor to perform the enrollment, identity verification and transaction auditing methods described above.

Accordingly, advantages of the present invention include that enrollment of users, validation of identity and auditing of transactions can be performed by the verification system without persistent and identifiable knowledge of the user and the tenant systems have no knowledge of the user association made by the verification system, thereby making the platform more reliable, faster, scalable, flexible and accurate, as well as eliminating privacy concerns.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF THE EMBODIMENTS

Figure 1:
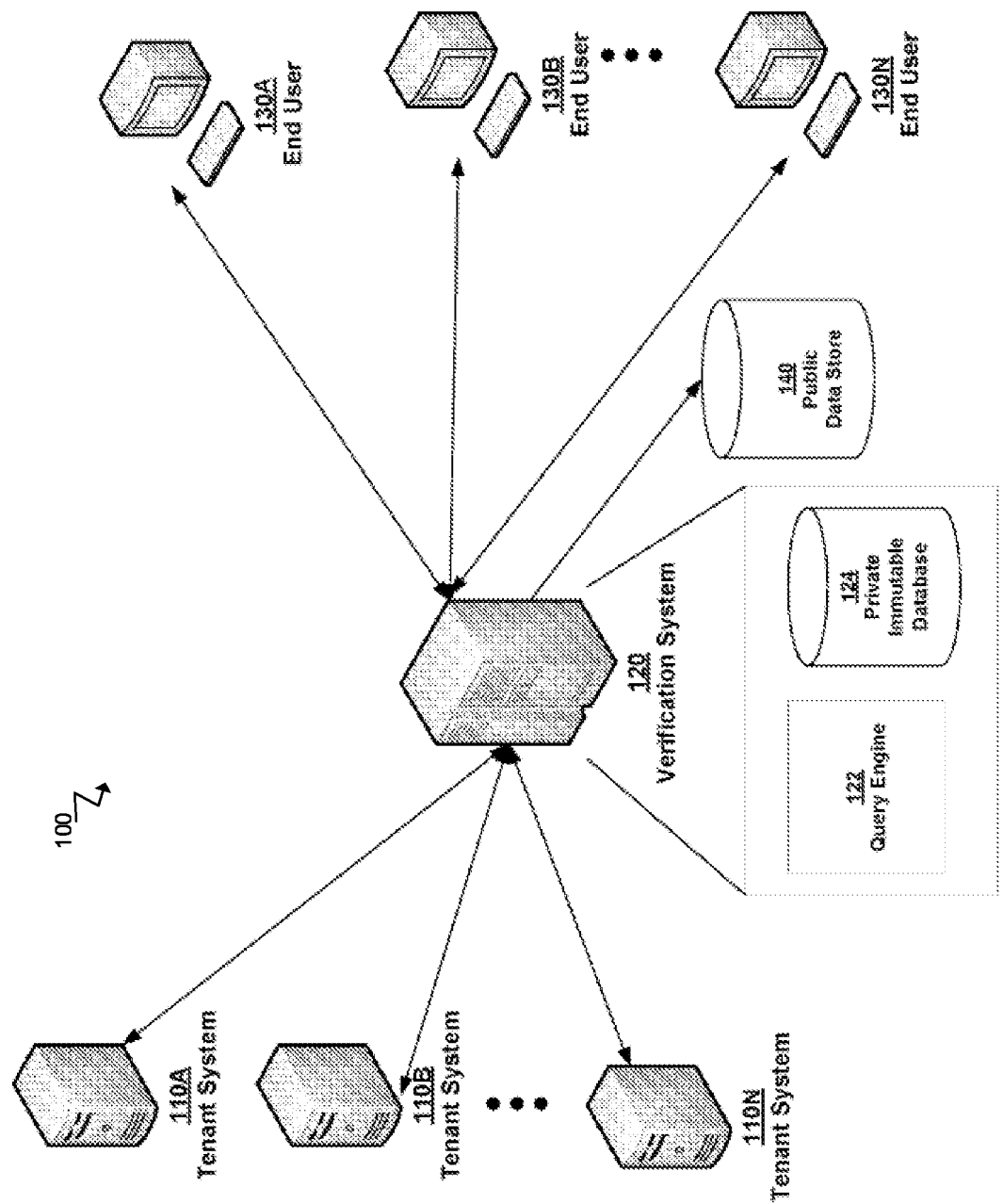
FIG. 1 illustrates a verification system 100 according to an embodiment of the invention.

Further features and advantages of the invention, as well as the structure and operation of various embodiments of the invention, are described in detail below with reference to the accompanying FIGS. 1-5, wherein like reference numerals refer to like elements. Although the invention is described in the context of implementing three types of biometrics (face, fingerprint, and iris biometrics), one of ordinary skill in the art recognizes that any type and number of biometrics may be implemented.

FIG. 1 illustrates a verification system 100 according to an embodiment of the invention. The system 100 comprises tenant systems I 110A-N, verification system 120, and end users 130A-N. Furthermore, the verification system further comprises query engine 122 and optionally an immutable database 124 like Blockchain where, unlike a traditional database, entries in an immutable database 124 cannot be altered or deleted once created. In an alternative embodiment of the invention, the immutable database 124 could reside within query engine 122. This system 100 can also comprise a public data store 140 such as a public blockchain, public database, or other data storage mechanism.

Functionally, query engine 122 receives enrollment, verification, and identification requests from one of the tenant systems 110A-N. In response to an enrollment request, query engine 122 requests identity information from one of end users 130A-N specified by the requesting tenant system. The identity information establishes the identity of the user using an identifying factor such as biometric data, password, PIN, device ID, etc. Query engine 122 determines whether the identity information is sufficient to establish the identity of the user. For example, with biometric data such as fingerprints, the end user may not have sent sufficient distinguishing fingerprint features to establish identity. However, upon success query engine 122 responds to the requesting tenant system in addition to the success or failure of the request a user token for the tenant system to associate with the user. Furthermore, the requesting tenant system regardless of success or failure receives a receipt of the transaction. Additionally, the end user can also receive a receipt of the transaction. Optionally, a receipt of the transaction is stored in public data store 140.

In response to a verification request, query engine 122 receives a user token from the tenant system. Query engine 122 decodes the user token and determines which end user the tenant system requires identity verification from. Then, query engine 122 requests and receives identity information from the end user. The query engine then verifies the identity of the end user based on the identity information. The success or failure of the identification is then transmitted to the tenant system. Once again, the requesting tenant system receives a receipt of the transaction. Optionally the end user receives a receipt of the transaction. Optionally, a receipt of the transaction is stored in public data store 140 as well as an external authentication store that has no relation to the identity that has been verified.

The query engine 122 can also provide verification or proof that a transaction took place. When query engine 122 receives a transaction ID, based on a private receipt generated by the query engine 122, a duplicate receipt can be transmitted either to the tenant system or the end user to serve as proof that the enrollment attempt or verification attempt was made. This process is described below.

Figure 2:
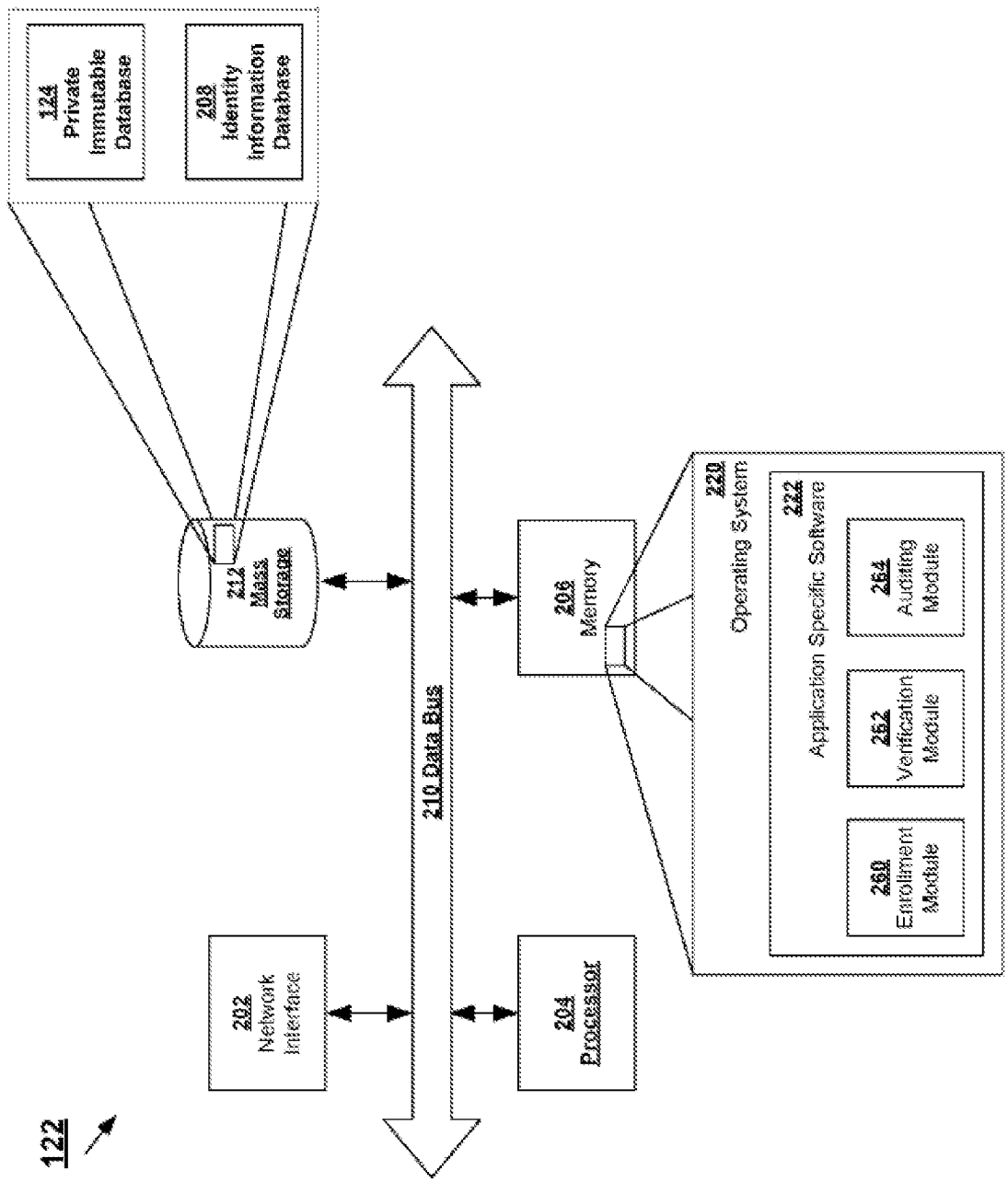
FIG. 2 illustrates a block diagram of the query engine according to an embodiment of the invention.

FIG. 2 illustrates a block diagram of the query engine 122 according to an embodiment of the invention. Generally, query engine 122 comprises a communications interface (shown as network interface 202), processor 204, memory 206 and optional mass storage 212, which all communicate using one or more data buses 210, which can include internal data buses, external serial buses, universal serial bus (USB), peripheral component interconnect (PCI) bus, serial advanced technology attachment (SATA), and/or external SATA (eSATA), the implementation of which is apparent to one of ordinary skill in the art.

The communications interface 202 is used to interface query engine 122 to external devices and systems such as optional immutable database 124, public datastore 140 as well as to external systems such as tenant system 110 and end user 130. In the depicted example, the interface is shown as network interface 202 such as a network interface card (NIC). Network interface 202 can be configured to carry data using the internet protocol (IP) with transmission control protocol (TCP) or user datagram protocol (UDP) and can be based on any number of data link protocols including but not limited to Ethernet, point-to-point protocol (PPP), high-level Data link control (HDLC) and advanced data communication control protocol (ADCCP). Alternatively or in addition, the communications interface can include other forms of inter-device communications including but not limited to universal serial bus (USB), IEEE-1394 (Firewire), eSATA, and/or high-definition multimedia interface (HDMI).

Mass storage 212 can comprise any number of storage media including but not limited to a hard disk drive, solid state drive, flash memory, and or optical storage media. Mass storage 212 is used to supplement memory 206 and is often configured with files in a file system, but may also provide storage for virtual memory as an extension of memory 206.

Processor 204 can be any device for executing instructions, particularly instructions stored in memory 206. Processor 206 can comprise any commercially available processor such as a central processor unit (CPU), floating-point processor unit (FPU), graphics processing unit (GPU), a multicore processor, a microprocessor (either in the form of a microchip or chip set), a macroprocessor, or generally any device for executing software instructions. Or processor 206 can comprise a custom-made processing device such as one made from a programmable logic array (PLA), field programmable gate array (FPGA), application specific integrated circuit (ASIC), solution on a chip (SOC), or combination thereof.

Memory 206 can comprise any one or combination of volatile memory elements such as random access memory (RAM) (for example, dynamic RAM (DRAM), static RAM (SRAM), synchronous dynamic RAM (SDRAM), double data rate (DDR) RAM, etc.) and/or nonvolatile memory elements such as read only memory (ROM, flash memory, hard drive, tape, optical media, etc.). In addition, memory 206 can comprise various components such as program memory for storing processor instructions, data memory for storing data used by the processor 204, and/or various levels of caches. It should be noted that mass storage 212 and memory 206 can share much of the same functionality, for example, program instructions can be stored both in mass storage 212 and read into memory 206 as the processor 204 executes the program instructions. Therefore, one of ordinary skill in the art should note that though described separately in this embodiment, memory 206 can perform any function described for mass storage 212.

The software in memory 206 can include one or more separate programs, each of which includes an ordered listing of executable instructions for implementing logical functions. Typically, the software in memory 206 which may initially be stored in mass storage 212, read into memory 206 for execution by processor 204, and can include operating system 220. Executing within the operating system 220 is application specific software 222. It should be noted, however, that the modules within application specific software 222 can be implemented in software, hardware or a combination of software and hardware. In addition to controlling and executing application specific software 222, operating system 220 can be configured to manage hardware resources including but not limited to input-output control, file and data management, memory management, communications controls and provide software services including but not limited to control the execution of other computer programs, scheduling, and inter-process communications.

Optionally, immutable database 124 can be implemented if not externally, as shown above, either directly in memory 206 or stored in mass storage 212. Immutable database 124 is used to store private transaction receipts. Similarly, identity information database 208 can be implemented if not externally, not shown, either directly in memory 206 or stored in mass storage 212. Identity information database 208 stores identity information for users who have been enrolled. For example, identity information database 208 can comprise biometric templates and/or other identifying factors mentioned previously.

In query engine 122, application specific software 222 comprises enrollment module 260, verification module 262, and auditing module 264. Application specific software 222 can also be provided and stored on a non-transient storage medium either for distribution or retrieval for execution by the processor 204 when needed.

More specifically in FIG. 2, enrollment module 260 handles the communication between query engine 122 and tenant system 110 and between query engine 122 and end users 130 during the enrollment process. Furthermore, enrollment module 260 retrieves identity information from end user 130, determines its validity and stores it in identity information database 208. It provides enrollment status to tenant system 110. In addition, it provides a transaction identifier and optionally a public transaction receipt to either tenant system 110 and/or the enrolling end user. It also stores a private transaction receipt in immutable database 124 and optionally a public transaction receipt in public data store 140.

Verification module 262 handles the communication between query engine 122 and tenant system 110 and between query engine 122 and end users 130 during the verification process. Furthermore, verification module 262 retrieves identity information from end user 130, verifies end user 130's identity using identity information previously stored during enrollment. It provides a verification outcome to tenant system 110. In addition, it provides a transaction identifier and optionally the transaction receipt to either tenant system 110 and/or the enrolling end user. It also stores a private transaction receipt in immutable database 124 and optionally a public transaction receipt in public data store 140.

Auditing module 264 can be used to validate a transaction. An auditor can provide auditing module 264 with a public receipt. Auditing module 264 can either confirm or dispute the validity of the receipt by retrieving the corresponding private receipt from immutable database 124 and comparing the two. The comparison can comprise the hashing of components of the private receipt to correspond to the hashed contents contained in the public receipt. In the alternative, an auditor can provide the transaction identifier of a public receipt to auditing module 264. Auditing module 264 can provide a duplicate public transaction generated from the private receipt by hashing components of the private receipt. The auditor can then compare the hashes from the duplicate transaction receipt and the transaction receipt the auditor possesses.

Figure 3A:
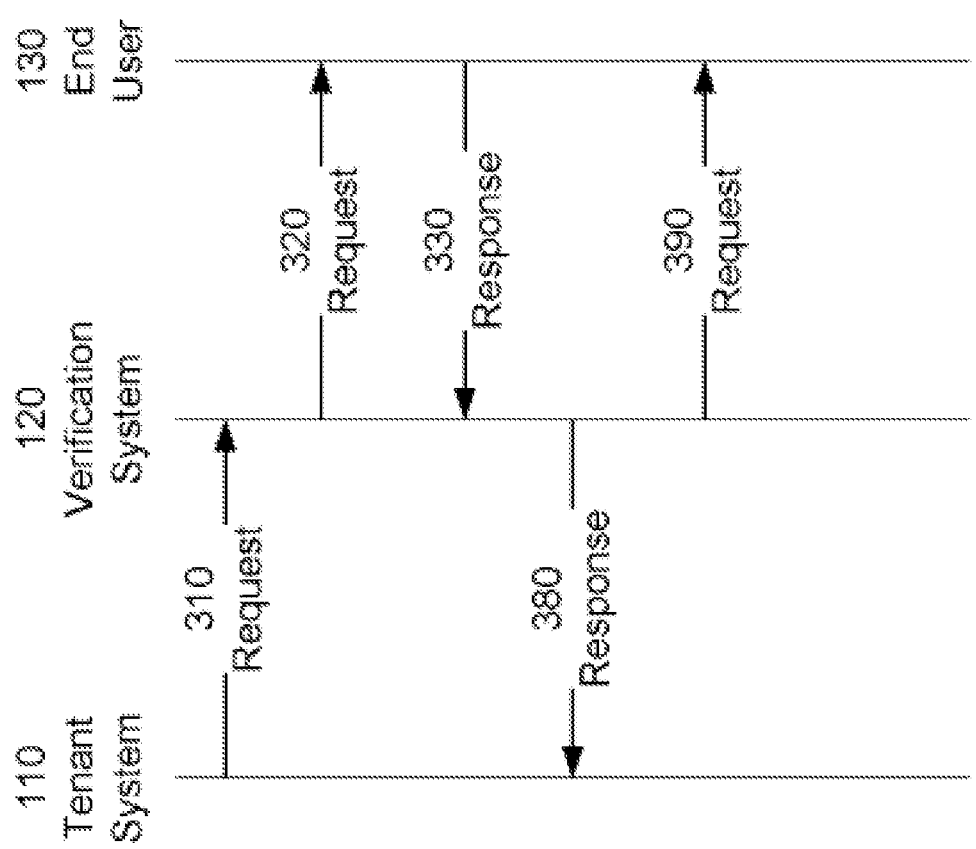
FIG. 3A illustrates an enrollment process according to an embodiment of the invention.
Figure 3B:
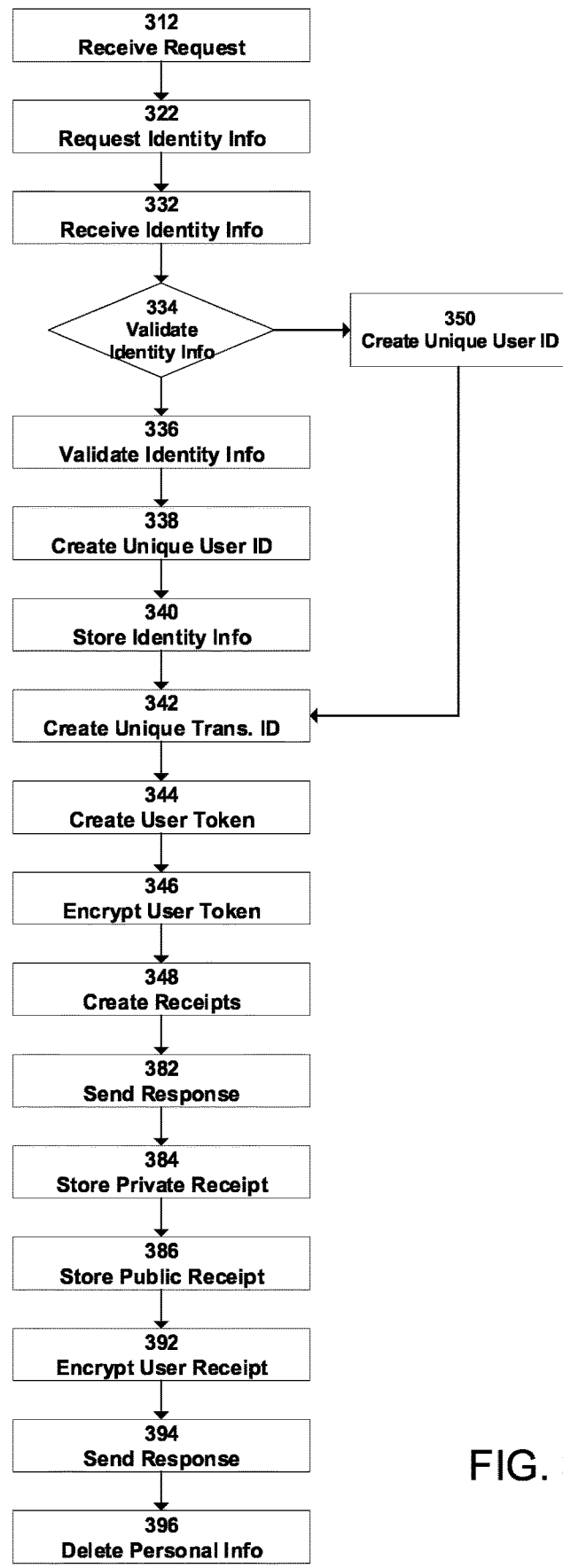
FIG. 3B illustrates a verification process according to an embodiment of the invention.

FIG. 3A illustrates an exemplary message diagram of the enrollment process and FIG. 3B shows a flow chart of the process at verification system 120 and more particularly verification engine 122. At step 312, enrollment request 310 is received by verification system 120 from sent from tenant system 110. The enrollment request 310 can comprise an application name within the tenant. At step 322, request 320 is sent to end user 130 from verification system 120. Request 320 solicits from end user 130 to send response 330 to verification system 120. At step 332, verification system 120 receives response 330, which comprises identity information. At step 334, verification system 120 validates the identity information. At step 336, identity information is validated. If the identity information is valid the process moves to step 338, a unique user identifier is created. At step 340, the identity information with the unique user identifier in the identity information database. At step 342, a globally unique transaction identifier is generated. At step 344 a user token is created comprising a tenant identifier and the unique user identifier. The user token can further comprise an application identifier. In one embodiment of the invention the tenant identifier and application identifier can be a name, in another embodiment it can be a globally unique identifier (GUID). At step 346, the user token is encrypted with a private key not known to tenant system 110 or any of the end users. At step 348, a private transaction receipt, a public transaction receipt and optionally a user transaction receipt is generated, which are described in greater detail in FIG. 5. If the identity information is not validated, the process moves to step 350 which is identical to step 338 and then proceeds to step 344. At step 382, response 380 is sent to tenant system 110, response 380 comprises the encrypted user token, a status indicative of the success or failure of the enrollment request and optionally public transaction receipt, but at minimum the transaction identifier. At step 384, the private transaction receipt is stored in immutable database 124. Optionally at step 386, the public transaction receipt is stored in public data store 140.

Optionally, response 390 is sent to the end user comprising the user receipt. If sent at step 392, the user receipt is encrypted using the end user's public key so only the end user can view the receipt. At step 394, response 390 is sent. In the enrollment process personally identifiable information such as name, birthdate, social security number, address, phone number may need to be conveyed to the tenant (such as through response 390), but are not necessary for verification system 120 to perform identity verification. At step 396 this personally identifiable information is removed from verification system 120.

It should be noted that all messages sent by verification system 120, namely message 320, response 380 and response 390 are digitally signed any of the well-known methods known to one skilled in the art, such as pretty good privacy (PGP), digital signature algorithm (DSA), etc. In this fashion, the end user and tenant know that the messages are genuine and not tampered with.

The user token received by tenant system 110 is the manner the tenant system 120 can identify a given end user to verification system 120. The tenant system 120 depending on its implementation can associate their own user identifier with the user token. Because the user token is encrypted by a private key, any tenant system (or external party for that matter) cannot obtain the verification's systems unique user identifier. Because identity information is associated with only with the unique user identifier, this identity information stored in identity information database remains anonymous to all but verification system 120 should the identify information database 208 become compromised.

Figure 4A:
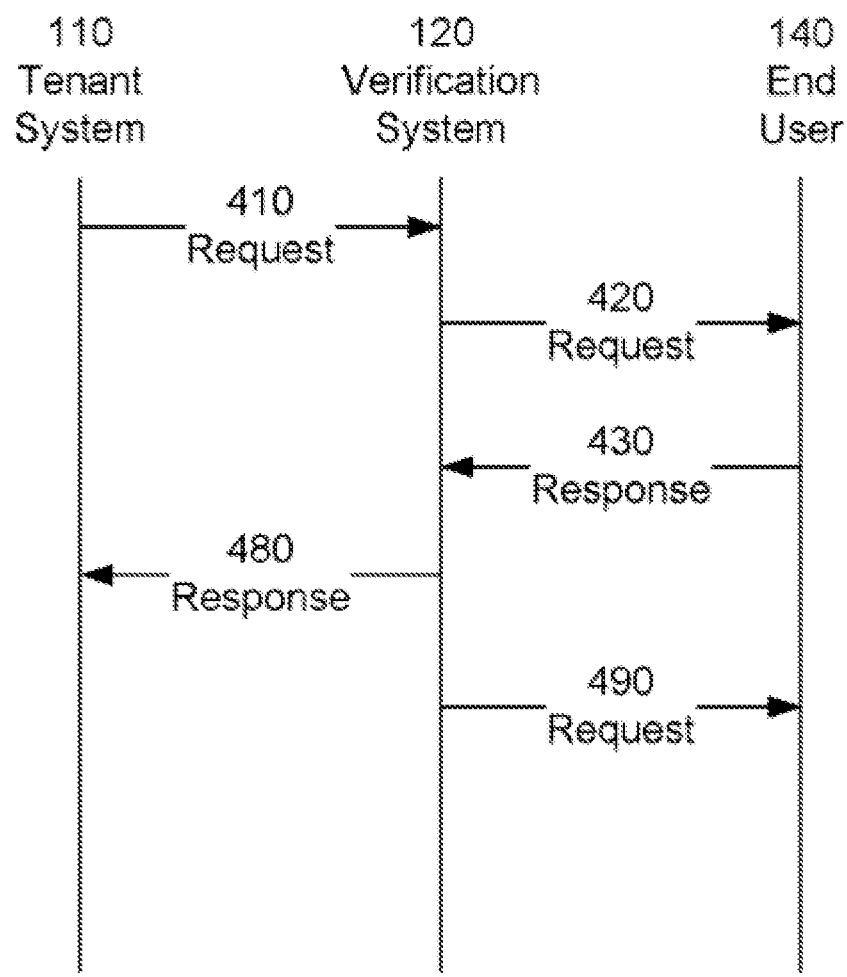
FIG. 4A illustrates an exemplary message diagram of the verification process.
Figure 4B:
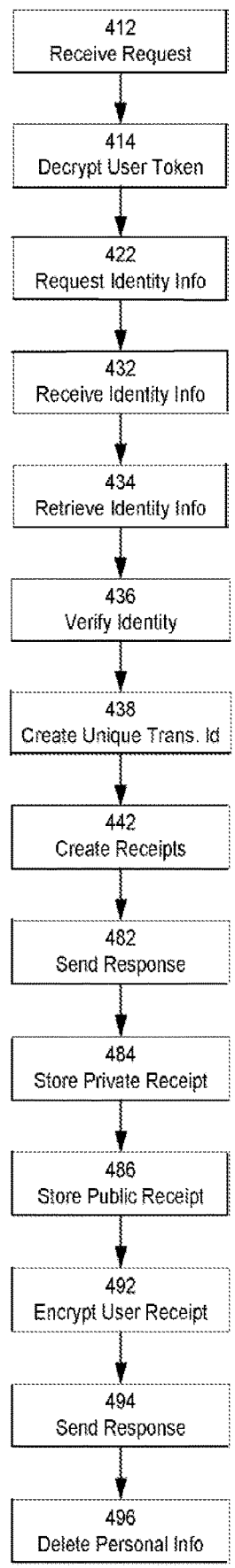
FIG. 4B shows a flow chart of the process at verification system.

FIG. 4A shows an exemplary message diagram of the verification process and FIG. 4B shows a flow chart of the process at verification system 120 and more particularly verification engine 122. At step 412, verification request 410 is received by verification system 120 sent from tenant system 110. The verification request 410 comprises the encrypted user token sent to tenant system 110 during enrollment. At step 414, the encrypted user token is decrypted to extract the end user's unique user identifier. At step 422, request 420 is sent to end user 130 associated with the unique user identifier from verification system 120. Request 420 solicits from end user 130 to send response 430 to verification system 120. At step 432, verification system 120 receives response 430, which comprises identity information. At step 434, identify information associated with the unique user identifier is retrieved from identity information database 208. At step 436, verification system 120 verifies end user 130's identity by comparing the identity information received from the end user with the identity information retrieved in step 434. The nature of the comparison depends on what form if identity information is used. For example, in biometric applications, the identity information may be biometric templates, so a comparison need not be an exact match as but a confidence score that meets a given threshold. At step 438, a globally unique transaction identifier is generated. At step 442, a private transaction receipt, a public transaction receipt and optionally a user transaction receipt is generated, which are described in greater detail in FIG. 5. At step 482, response 480 is sent to tenant system 110, response 480 comprises the outcome of the identity and optionally public transaction receipt, but at minimum the transaction identifier. In fact, response could consist of the public transaction receipt, as the public transaction receipt comprises both the outcome of the verification and the transaction identifier. At step 484, the private transaction receipt is stored in immutable database 124. Optionally at step 486, the public transaction receipt is stored in public data store 140.

Optionally, response 490 is sent to the end user comprising the user receipt. If sent at step 492, the user receipt is encrypted using the end user's public key so only the end user can view the receipt. At step 494, response 490 is sent. In the verification process there may be cases where personally identifiable information is conveyed to the tenant (such as through response 490), but are not necessary for verification system 120 to perform identity verification. At step 496 this personally identifiable information is removed from verification system 120.

It should be noted that just like in the enrollment process, all messages sent by verification system 120, namely message 420, response 480 and response 490 are digitally signed any of the well-known methods known to one skilled in the art.

Figure 5:
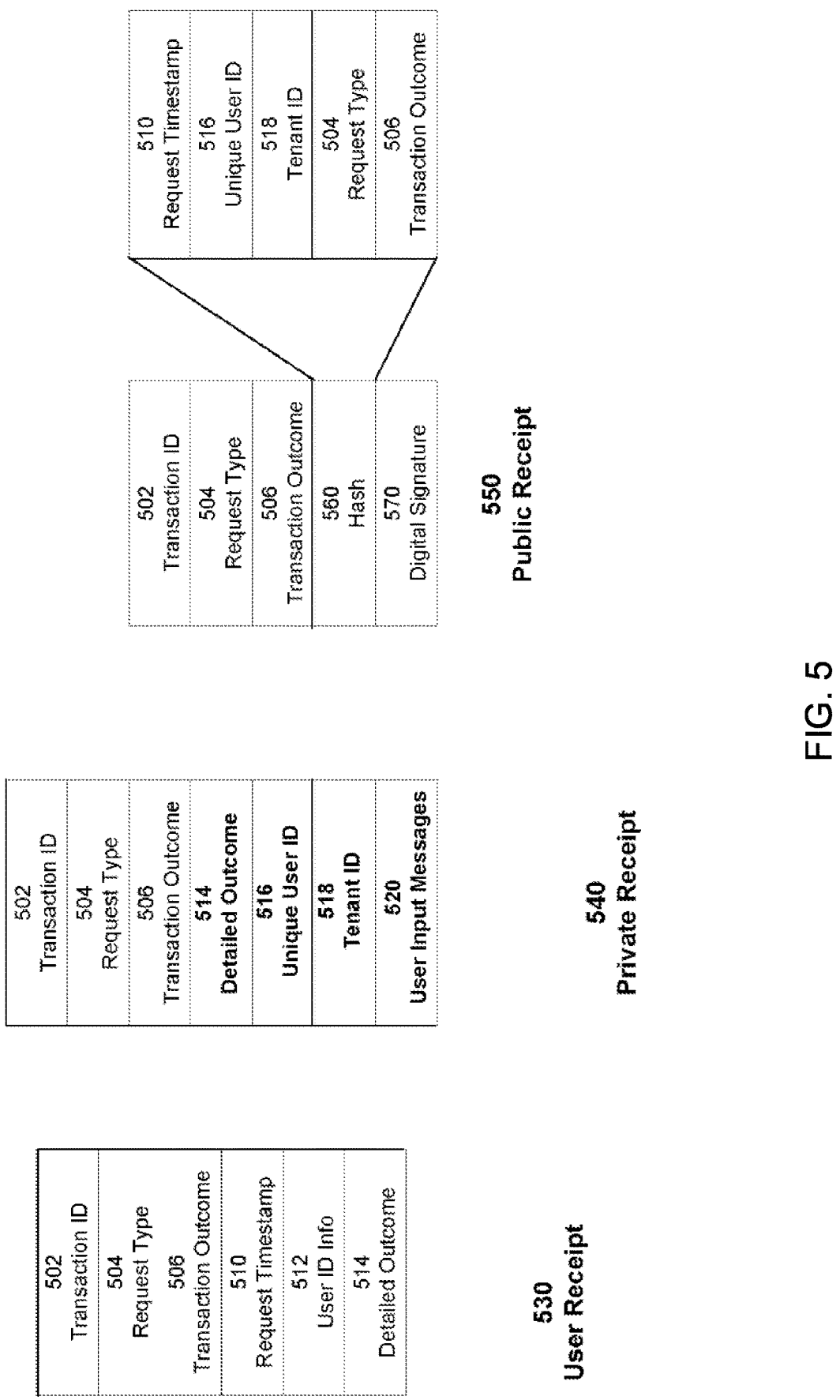
FIG. 5 illustrates a transaction receipt accordingly to an exemplary embodiment of the invention.

FIG. 5 shows exemplary structures for transaction receipts. User receipt 530 comprises transaction identifier 502, request type 504, transaction outcome 506, user identity information 512, detailed outcome 514 and optionally, request timestamp 510. Private receipt 540 comprises transaction identifier 502, request type 504, transaction outcome 506, unique user identifier 516, unique tenant identifier 518, detailed outcome 514 and user input messages 520. Public receipt 550 comprises transaction identifier 502, request type 504, transaction outcome 506, hash 560 and digital signature 570. Hash 560 is formed by unique user identifier 516 and unique tenant identifier 518 into a hash value using one of many cryptographic hashing methods known to those in the art, such as but not limited to SHA-1, SHA-256, MD5, and SHA-512. Hash 560 can also be formed by additionally combining request type 504 and transaction outcome 506. Additional randomizing factors can be combined in the hash as well such as request timestamp 510 or a number used once (nonce). Digital signature 570 is formed through one of the many digital signature techniques mentioned above, such as PGP, DSA, etc.

In an embodiment employing biometrics as the identification method, user identity information 512 can comprise biometric samples which are not retained in the private transaction receipt but returned to the end user via the user transaction receipt, after this information is used for identity verification and returned to the end user it is removed from the verification system such as in step 496. Furthermore, detailed outcome 514 can include any biometric mode (or multiples), such as, but not limited to, iris, fingerprint, face, etc., percentage match and time taken to make the comparison.

Due to the nature of the receipts and the use of the user token, the end user and tenant can verify that the work has been done by verification server 120 without knowledge of the inner workings of verification server 120. This is particularly useful in auditing the transactions.

For example, the end user can verify that verification server 120 did the work of verification and by reviewing the veracity of user identity information 512 and detailed outcome 514. For example, in a biometric application, user identity information 512 comprises the biometric samples sent by the end user and the proof of work lies in the detailed outcome 514 which as mentioned could include the mode biometric match and time taken.

The tenant or a third party even can verify from public receipt that work has been done. The tenant or third party can ask verification system 120 for validation of the public receipt. Verification system 120 can retrieve the corresponding private receipt as identified by transaction identifier 502 from immutable database 124. From the private receipt a hash can be generated. The hash is formed from the unique user identifier and the unique tenant identifier and possibly request type 504 and transaction outcome 506 from the retrieved private receipt. The hash can also include randomizing factors such as the request timestamp and/or a nonce. If the hash generated by verification system 120 matches the hash of the public receipt then the receipt is proven to be authentic. It should be noted that since the unique user identifier and unique tenant identifier are contained only in the private receipt the tenant or third-party auditor cannot associate the transaction with a particular tenant nor end user, but merely that the transaction took place and the receipt is valid, providing proof with zero knowledge.

The foregoing is offered primarily for purposes of illustration. It will be readily apparent to those skilled in the art that the materials and their proportions, as well as the operating conditions, procedural steps and other parameters of the inventions described herein may be further modified or substituted in various ways without departing from the spirit and scope of the invention.

We claim:

1. A method of validating an identity of a user at a verification system:
   receiving a validation request from a tenant system; said validation request comprising an encrypted token associated with the user;
   decrypting the encrypted token to extract a unique identifier associated with the user;
   requesting first identity information from the user; receiving the first identity information from the user;
   validating the first identity information with identity information previously associated with the unique identifier;
   sending a first response to the tenant system comprising a status of success or failure based upon the outcome of the validating step and a first transaction identifier;
   creating a first private transaction receipt comprising the first transaction identifier, a user identifier, an identifier for the tenant system, and user information;
   creating a first public transaction receipt comprising the first transaction identifier and a hash, wherein the hash is formed from the user identifier, the identifier for the tenant system, and the user information.

2. The method of claim 1 further comprising a method of enrolling a user with the tenant system comprising:
   receiving an enrollment request from the tenant system;
   requesting second identity information from the user;
   receiving the second identity information from the user;
   assigning the unique identifier to the user;
   associating the unique identifier with the second identity information;
   creating a token comprising the unique identifier and the identifier for the tenant system;
   encrypting the token with a secret key held at the verification system to form an encrypted token;
   sending a second response comprising the encrypted token to the tenant system, and a second transaction identifier;
   creating a second private transaction receipt comprising the second transaction identifier, the user identifier, the identifier for the tenant system and the user information;
   creating a second public transaction receipt comprising the second transaction identifier and a second hash formed from the user identifier, the identifier for the tenant system and the user information.

3. The method of claim 2, wherein the first response comprises a timestamp and the second response comprises a second timestamp.

4. The method of claim 2, wherein the first response is digitally signed and the second response is digitally signed.

5. The method of claim 2, wherein the first public transaction receipt is digitally signed and the second public transaction receipt is digitally signed.

6. The method of claim 2, wherein the first private transaction receipt and the second private transaction receipt are stored in an immutable database.

7. The method of claim 2 wherein the first transaction public transaction receipt and the second transaction public transaction receipts are stored in a public database.

8. The method of claim 2 wherein the first public transaction receipt and the second transaction public transaction receipts are stored in a public blockchain.

9. The method of claim 1 further comprising a method of auditing comprising:
   receiving a third transaction identifier;
   retrieving a private transaction receipt associated with the third transaction identifier; said private transaction receipt comprising the user identifier, the tenant identifier and the user information;
   creating a third hash from the user identifier, the tenant identifier and the user information;
   providing the third hash for validation with a hash included in a public transaction receipt associated with the third transaction identifier.

10. The method of claim 1 further comprising a method of auditing a transaction comprising a transaction identifier said method of auditing comprising:
   receiving a public transaction receipt of the transaction said public transaction receipt comprising a third transaction identifier and a first hash;
   retrieving a private transaction receipt associated with the third transaction identifier; said private transaction receipt comprising a user identifier, a tenant identifier and user information;
   creating a second hash from the user identifier, the tenant identifier and the user information;
   validating the public transaction receipt if the first hash and the second hash match;
   disputing the public transaction receipt if the first hash and the second hash do not match.

11. A method at a verification system of auditing a transaction comprising:
   receiving a public transaction receipt of the transaction said public transaction receipt comprising a transaction identifier and a first hash;
   retrieving a private transaction receipt associated with the transaction identifier;
   said private transaction receipt comprising a user identifier, a tenant identifier and user information;
   creating a second hash from the user identifier, the tenant identifier and the user information;
   validating the public transaction receipt if the first hash and the second hash match;
   disputing the public transaction receipt if the first hash and the second hash do not match.

12. The method of claim 11 wherein the public transaction receipt is received from a public database.

13. The method of claim 12 wherein the public database is a public block chain.

\* \* \* \* \*